(12) United States Patent
Qian et al.

(10) Patent No.: US 11,353,891 B2
(45) Date of Patent: Jun. 7, 2022

(54) TARGET TRACKING METHOD AND APPARATUS

(71) Applicant: SZ DJI TECHNOLOGY CO., LTD., Shenzhen (CN)

(72) Inventors: Jie Qian, Shenzhen (CN); Xuyang Feng, Shenzhen (CN); Peiliang Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 628 days.

(21) Appl. No.: 16/199,622

(22) Filed: Nov. 26, 2018

(65) Prior Publication Data
US 2019/0094890 A1 Mar. 28, 2019

Related U.S. Application Data

(63) Continuation of application No. PCT/CN2016/083388, filed on May 25, 2016.

(51) Int. Cl.
G05D 1/10 (2006.01)
B64C 39/02 (2006.01)
G05D 1/00 (2006.01)
G05D 1/04 (2006.01)
G05D 1/12 (2006.01)

(52) U.S. Cl.
CPC ............ *G05D 1/106* (2019.05); *B64C 39/024* (2013.01); *G05D 1/0094* (2013.01); *G05D 1/042* (2013.01); *G05D 1/12* (2013.01); *B64C 2201/127* (2013.01); *B64C 2201/141* (2013.01)

(58) Field of Classification Search
CPC ...... G05D 1/106; G05D 1/0094; G05D 1/042; G05D 1/12; B64C 39/024
USPC ........................................................ 701/519
See application file for complete search history.

(56) References Cited

U.S. PATENT DOCUMENTS

| 6,144,899 | A | 11/2000 | Babb et al. |
| 8,892,275 | B2* | 11/2014 | Constans ............. G05D 1/0005 701/7 |
| 10,207,802 | B2* | 2/2019 | Knoblach ................. B64B 1/50 |
| 10,538,324 | B2* | 1/2020 | Fengler ................. B64C 39/024 |
| 2013/0060406 | A1* | 3/2013 | Christensen ......... G05D 1/0607 701/4 |
| 2015/0134143 | A1* | 5/2015 | Willenborg .......... G05D 1/0094 701/2 |

(Continued)

FOREIGN PATENT DOCUMENTS

| CN | 101813944 A | 8/2010 |
| CN | 102591353 A | 7/2012 |
| CN | 102902275 A | 1/2013 |

(Continued)

OTHER PUBLICATIONS

The World Intellectual Property Organization (WIPO) International Search Report for PCT/CN2016/083388 dated Feb. 28, 2017 6 pages.

*Primary Examiner* — Peter D Nolan
*Assistant Examiner* — Luke Huynh
(74) *Attorney, Agent, or Firm* — Anova Law Group, PLLC

(57) ABSTRACT

A method for controlling a movable object includes obtaining an expected height of the movable object, obtaining a measured height of the movable object relative to a ground, and controlling a height of the movable object according to the expected height and the measured height.

25 Claims, 5 Drawing Sheets

(56) References Cited

U.S. PATENT DOCUMENTS

2016/0070264 A1* 3/2016 Hu .......................... G08G 5/04
   701/2

FOREIGN PATENT DOCUMENTS

| CN | 103116359 A | 5/2013 |
| CN | 105045281 A | 11/2015 |
| CN | 105068547 A | 11/2015 |
| CN | 105182992 A | 12/2015 |
| CN | 105184776 A | 12/2015 |
| CN | 105425819 A | 3/2016 |
| CN | 105487552 A | 4/2016 |
| CN | 105518555 A | 4/2016 |
| CN | 105527975 A | 4/2016 |
| WO | 2004041381 A2 | 5/2004 |

* cited by examiner

TARGET TRACKING METHOD AND APPARATUS

CROSS-REFERENCE TO RELATED APPLICATION

This application is a continuation application of International Application No. PCT/CN2016/083388, filed on May 25, 2016, the entire contents of which are incorporated herein by reference.

TECHNICAL FIELD

The present disclosure relates to the field of tracking technology and, more particularly, to a target tracking method, a target tracking apparatus, a target tracking unmanned aerial vehicle (UAV), a target tracking system, and a storage medium.

BACKGROUND

Various consumer-grade unmanned aerial vehicles (UAVs) are used for aerial photography. Technologies associated with aerial photography includes using a visual recognition technology to recognize a target in an image, and controlling a UAV to automatically follow the target during a flight according to the recognized information. The function is also referred to as a "tracking flight."

During the tracking flight, the visual recognition technology can only provide velocity information in a forward movement direction and X-direction velocity information, i.e., X-component velocity information, of the UAV target. Thus, simultaneously controlling the X-component velocity and a Z-component velocity of the UAV cannot rely solely on the visual recognition. If the terrain is complex and changing and the target goes uphill or downhill, the UAV cannot track the target well.

SUMMARY

In accordance with the disclosure, there is provided a method for controlling a movable object including obtaining an expected height of the movable object, obtaining a measured height of the movable object relative to a ground, and controlling a height of the movable object according to the expected height and the measured height.

Also in accordance with the disclosure, there is provided an apparatus for controlling a movable object including a processor and a memory. The memory stores instructions that, when executed by the processor, cause the processor to obtain an expected height of the movable object, obtain a measured height of the movable object relative to a ground, and control a height of the movable object according to the expected height and the measured height.

Also in accordance with the disclosure, there is provided an unmanned aerial vehicle (UAV) including an apparatus configured to control the UAV. The apparatus includes a processor and a memory. The memory stores instructions that, when executed by the processor, cause the processor to obtain an expected height of the movable object, obtain a measured height of the movable object relative to a ground, and control a height of the movable object according to the expected height and the measured height.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Example embodiments will be described with reference to the accompanying drawings, in which the same numbers refer to the same or similar elements unless otherwise specified.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

Further, in the present disclosure, the disclosed embodiments and the features of the disclosed embodiments may be combined when there are no conflicts.

The present disclosure provides a method and an apparatus for controlling a movable object. The method may include receiving a first signal, where the first signal may characterize an expected height of the movable object; receiving a second signal, where the second signal may characterize a measured height of the movable object relative to a ground; obtaining a third signal according to a difference between the expected height and the measured height, where the third signal may be used for changing a height of the movable object. As such, even when the terrain is complex and changing such that a tracked target moves uphill or downhill, a stable relative height with respect to the tracked target can be maintained.

In the descriptions of the present disclosure, a UAV is used as an example of the movable object merely for illustrative purposes. The movable object can include, but is not limited to, a UAV. Other types of movable objects can be chosen according to various application scenarios.

Figure 1:
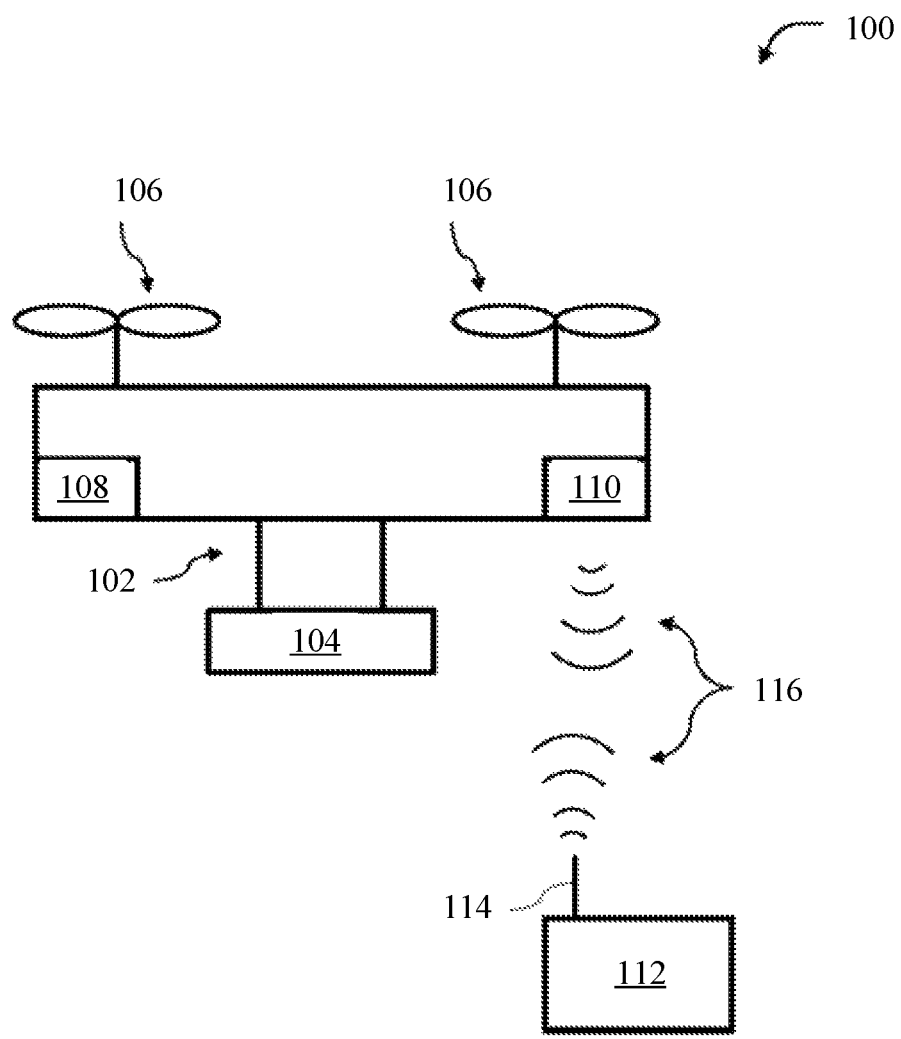
FIG. 1 is a schematic view of an example movable object consistent with various disclosed embodiments of the present disclosure.

FIG. 1 is a schematic view of an example movable object 100 consistent with various disclosed embodiments of the present disclosure. As shown in FIG. 1, the movable object 100 includes a supporting body 102 and a load 104. Although the movable object 100 is described as an aerial vehicle, the movable object is not limited to an aerial vehicle. Various types of movable objects may be chosen according to actual application scenarios. The embodiments described herein with an aerial vehicle system taken as an example can be suitable for any movable object where appropriate, including but are not limited to, e.g., a UAV. In some embodiments, the load 104 may be attached directly to the movable object 100 without a need for the supporting body 102. In some embodiments, as shown in FIG. 1, the movable object 100 further includes a power mechanism 106, a sensing system 108, and a communication system 110.

In some embodiments, the power mechanism 106 may include one or more rotating bodies, propellers, blades, engines, motors, wheels, bearings, magnets, and/or nozzles. For example, a rotating body of the power mechanism may include a self-tightening rotating body, a rotating body assembly, or another rotating body power component. The movable object can include one or more power mechanisms. In some embodiments, the one or more power mechanisms may be of a same type. In some other embodiments, the one or more power mechanisms may be of different types. The power mechanisms 106 may be attached to the movable object by various suitable means, e.g., through a support component such as a driving shaft. The power mechanisms 106 may be attached to various suitable locations of the movable object 100, such as a top end, a lower end, a front end, a back end, a side, or any combination thereof.

In some embodiments, the power mechanism 106 can cause the movable object to take off vertically from a surface or to land vertically on the surface without a need for the movable object 100 to make a horizontal movement, e.g., without a need to slide on a track. In some embodiments, the power mechanism 106 may cause the movable object 100 to hover in a preset position and/or a preset direction in the air. One or more power mechanisms 100 may be independent of other power mechanisms when being controlled. In some embodiments, one or more power mechanisms 100 can be controlled at a same time. For example, the movable object 100 may have a plurality of horizontally oriented rotating bodies to track lifting and/or pushing of the target. The horizontally oriented rotating bodies may be actuated to cause the movable object 100 to take off vertically, descend vertically, and/or hover. In some embodiments, some of the horizontally oriented rotating bodies may rotate clockwise, and some other of the horizontally oriented rotating bodies may rotate counterclockwise. For example, the number of rotating bodies that rotate clockwise may be equal to the number of rotating bodies that rotate counterclockwise. A rotation rate of each horizontally oriented rotating body can be independently changed to achieve lifting and/or pushing operation(s) caused by each rotating body, thereby adjusting a spatial orientation, a velocity and/or an acceleration of the movable object 100, e.g., rotations and translations with respect to up to three degrees of freedom.

The sensing system 108 may include one or more sensors to sense a spatial orientation, a velocity, and/or an acceleration of the movable object 100, e.g., rotations and translations with respect to up to three degrees of freedom. The one or more sensors may include any above-described sensor, such as at least one of a global positioning system (GPS) sensor, a motion sensor, an inertial sensor, a proximity sensor, or an image sensor. Sensed data provided by the sensing system 108 may be used for tracking the spatial orientation, the velocity, and/or the acceleration of a target, by using suitable processing circuits and/or control circuits as described below. In some embodiments, the sensing system 108 may be configured to collect data of an environment of the movable object, such as weather conditions, potential obstacles to be approached, locations of geographic features, locations of man-made structures, and/or the like.

The communication system 110 can communicate with a terminal 112 having a communication system 114 through wireless signals 116. Each of the communications systems 110 and 114 may include one or more transmitters, receivers, and/or transceivers for wireless communications. The communication can include a one-way communication, such that data can be sent in one direction. For example, the one-way communication may include only the movable object 100 transmitting data to the terminal 112, or vice versa. One or more transmitters of the communication system 110 may send data to one or more receivers of the communication system 112, or vice versa. In some embodiments, the communication may include a two-way communication, such that data can be transmitted between the movable object 100 and the terminal 112 in two directions. The bi-directional communication, i.e., the two-way communication, may include one or more transmitters of the communication system 110 sending data to one or more receivers of the communication system 114, and vice versa.

In some embodiments, the terminal 112 may provide control data to at least one of the movable object 100, the supporting body 102, or the load 104, and may receive information from at least one of the movable object 100, the supporting body 102, or the load 104, where the information may include position information and/or motion information of the movable object, the supporting body, and/or the load, and/or data sensed by the load such as image data captured by a camera. In some embodiments, the control data of the terminal may include instructions associated with a position, a motion, and/or an actuation, and/or control of the movable object, the supporting body, and/or the load. For example, the control data may cause a change in the position and/or direction of the movable object, e.g., by controlling the power mechanism 106, and/or may cause a movement of the supporting body relative to the movable object, e.g., through control of the supporting body 102. The control data of the terminal can control the load, such as controlling an operation of, for example, a camera or another image capturing device. The operation may include, for example, capturing still or dynamic images, zooming, turning on or off, switching imaging modes, changing an image resolution, changing a focus, changing a depth of field, changing an exposure time, and/or changing a viewable angle or field of view. In some embodiments, the communication of the movable object, the supporting body, and/or the load may include information sent by one or more sensors, such as the sensing system 108 and/or the load 104. The communication may include sensed information transmitted from one or more different types of sensors, e.g., a GPS sensor, a motion sensor, an inertial sensor, a proximity sensor, and/or an image sensor. The sensed information may be spatial information (such as information associated with position and/or direction) of the movable object, the supporting body, and/or the load, or movement information (such as information associated with motion and/or acceleration) of the movable object, the supporting body, and/or the load. Sensed information transmitted from the load may include data captured by the load or a status of the load. The control data transmitted from the terminal 112 may be used for tracking status of at least one of the target, the supporting body 102, or the load 104. In some embodiments, the supporting body 102 and the load 104 each may include a communication circuit configured to communicate with the terminal 112, such that the terminal can separately communicate with or track the target, the supporting body 102, and the load 104.

In some embodiments, the movable object 100 may communicate with a remote device other than the terminal 112. The terminal 112 may also communicate with another remote device or another movable object. For example, the movable object and/or the terminal 112 may communicate with another movable object, a supporting body of another movable object, and/or a load of another movable object. The above-described additional remote device may include a second terminal or another computing device as needed, such as a computer, a desktop computer, a tablet computer, a smart phone, and/or another mobile device. The additional remote device may transmit data to the movable object 100, receive data from the movable object 100, transmit data to the terminal 112, and/or receive data from the terminal 112. In some embodiments, the additional remote device may be connected to the Internet or other telecommunication network to upload data received from the movable object 100 and/or the terminal 112 to a website or a server.

In some embodiments, a movement of the movable object, a movement of the supporting body, and a movement of the load relative to a fixed reference such as an external environment, and/or movement between each other may be controlled by the terminal. The terminal may include a remote control terminal arranged at a position away from the movable object, the supporting body and/or the load. The terminal can be arranged at or attached to a support platform. In some embodiments, the terminal may be handheld or wearable. For example, the terminal may include a smart phone, a tablet computer, a desktop computer, a computer, glasses, gloves, a helmet, a microphone, or any combination thereof. In some embodiments, the terminal may include a user interface such as a keyboard, a mouse, a joystick, a touch screen, and/or a display. Any suitable user input may interact with the terminal, such as a user input for manually inputting an instruction, voice control, gesture control, and/or position control, e.g., through a motion, a position, and/or a tilt of the terminal.

The terminal can be used to track various statuses of the target, the supporting body, and/or the load. For example, the terminal can be used to track a position and/or an orientation of the target, the supporting body, and/or the load relative to a fixed reference, and/or a position and/or an orientation between each other. In some embodiments, the terminal can be used to track an individual component of the target, the supporting body, and/or the load, such as an actuating component of the load, a sensor of the load, a transmitter of the load, or the like. The terminal may include a wireless communication device for communicating with the movable object, the supporting body, and/or the load.

The terminal may include a suitable display device for displaying information of the movable object, the supporting body, and/or the load. For example, the terminal may be used for displaying information of the movable object, the supporting body, and/or the load, such as a position, a translational speed, a translational acceleration, an orientation, an angular velocity, an angular acceleration, or any combination thereof. In some embodiments, the terminal may display information provided by the load, such as data provided by a functional load, e.g., images recorded by a camera or other image capture device.

In some embodiments, one terminal not only can track the target, the supporting body and/or the load, such as a motion or control status, but also can receive and/or display information from the movable object, the supporting body and/or the load. For example, the terminal can control a position of the load relative to the environment, and can display image data captured by the load or information associated with the position of the load at a same time. In some embodiments, different terminals may be configured to control different functions. In some embodiments, a first terminal may be configured to track a movement or status of the target, the supporting body and/or the load, and a second terminal may be configured to receive and/or display information of the movable object, the supporting body, and/or the load. For example, the first terminal may be configured to control a position of the load relative to the environment, and the second terminal may be configured to display an image captured by the load. Various communication approaches can be adopted between the movable object and an integrated terminal that not only can track a target but also can receive data, or between the movable object and a plurality of terminals that can track target(s) and receive data. For example, at least two different communication approaches may be adopted between the movable object and the terminal that can track target(s) and receive data.

Figure 2:
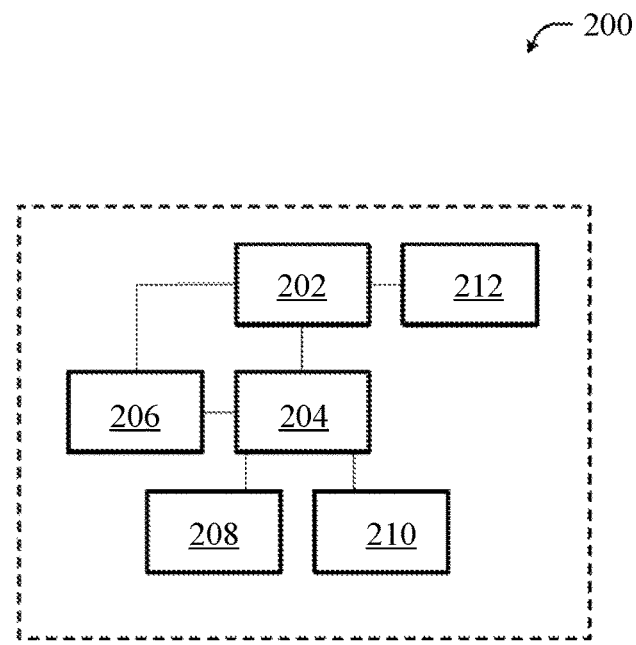
FIG. 2 is a block diagram of an example system for tracking a movable object consistent with various disclosed embodiments of the present disclosure.

FIG. 2 is a block diagram of an example system 200 for tracking a movable object consistent with various disclosed embodiments of the present disclosure. The embodiments of the system 200 can be combined with suitable embodiments of above-described systems, devices, and/or methods. For example, the system 200 may be implemented in or carried by a movable object, such as the movable object 100 described above. As shown in FIG. 2, the system 200 includes a sensing circuit 202, a processing circuit 204, a non-transitory computer-readable medium 206, a control circuit 208, and a communication circuit 210.

The sensing circuit 202 may be configured to use different types of sensors and adopt different methods to collect associated information of the movable object. The different types of sensors can sense different types of signals or sense signals from different sources. For example, the sensor may include an inertial sensor, a GPS sensor, a proximity sensor such as a lidar, and/or a visual/image sensor such as a camera. The sensing circuit 202 is coupled to a processing circuit 204 that includes one or more processors. In some embodiments, as shown in FIG. 2, the sensing circuit 202 is coupled to a transmitting circuit 212, such as a Wi-Fi image transmitting circuit, for directly transmitting sensed data to a suitable external device or system. For example, the transmitting circuit 212 may be configured to transmit images captured by a camera of the sensing circuit 202 to a remote terminal.

The processing circuit 204 may include one or more processors, e.g., a programmable processor such as a central processor. For example, the processing circuit 204 may include a field-programmable gate array (FPGA) or one or more advanced reduced-instruction-set-computing machine (ARM) processors. The processing circuit 204 may be coupled to a non-transitory computer-readable medium 206. The non-transitory computer-readable medium 206 may store logics, codes, and/or computer instructions executed by the processing circuit 204 for performing one or more processes. The non-transitory computer-readable medium 206 may include one or more memory circuits, e.g., a removable medium or an external memory such as a secure digital (SD) card or a random access memory (RAM). In some embodiments, data sensed by the sensing circuit 202 may be directly transmitted and stored in a storage circuit of the non-transitory computer-readable medium 206. The storage circuit of the non-transitory computer-readable medium 206 may store logics, codes, and/or computer instructions executed by the processing circuit 204 for performing various methods consistent with the disclosure, such as the above-described methods. For example, the processing circuit 204 may be configured to execute instructions to cause one or more processors of the processing circuit 204 to perform the above-described tracking functions. The storage circuit may store sensed data obtained or sensed by the sensing circuit. The sensed data may be processed by the processing circuit 204. In some embodiments, the storage circuit of the non-transitory computer-readable medium 206 may store processed results generated by the processing circuit 204.

In some embodiments, as shown in FIG. 2, the processing circuit 204 is coupled to the control circuit 208 to track a status of the target. For example, the control circuit 208 can be configured to track a power mechanism of the target to adjust a spatial orientation, a velocity, and/or an acceleration of the movable object with respect to six degrees of freedom. In some embodiments, the control circuit 208 may control at least one of a supporting body, a load, or a sensing circuit.

The processing circuit 204 is coupled to the communication circuit 210 to transmit data to and/or receive data from one or more peripheral devices, e.g., a terminal, a display device, and/or another remote control device. Various suitable communication methods can be adopted, such as a wired communication and/or a wireless communication. For example, the communication circuit 210 may use one or more local area networks, wide area networks, infrared communications, radio communications, Wi-Fi, peer-to-peer (P2P) networks, telecommunication networks, cloud networks, and/or the like. In some embodiments, relay stations can be used, such as signal towers, satellites, mobile base stations, and/or the like. Wireless communications may include a close range communication and/or a non-close range communication. In some embodiments, a line-of-sight distance may or may not needed during the communication. The communication circuit 210 may transmit one or more types of sensing data to the sensing circuit 202 and/or receive one or more types of sensing data from the sensing circuit 202, may receive processed results generated by the processing circuit 204, and/or receive a preset control data or user instructions sent by a terminal or a remote controller.

Various arrangements may be adopted for components of the system 200. For example, one or more components of system 200 may be arranged at the movable object, the supporting body, the load, the terminal, the sensing system, or an additional external device that communicates with the above-described devices. In addition, although FIG. 2 depicts one processing circuit 204 and one non-transitory computer-readable medium 206, those skilled in the art would understand that such a depiction is not a limitation, and the system 200 can include a plurality of processing circuits and/or a plurality of non-transitory computer-readable media. In some embodiments, one or more of the processing circuits and/or non-transitory computer-readable media may be located at different locations, such as the movable object, the supporting body, the load, the terminal, the sensing system, an additional external device that communicates with the above-described devices, and/or any combination thereof. Thus, various processes or storage functions performed by the system 200 may occur at different positions.

Using computer vision, position information of a target can be calculated in real time according to image information captured by an imaging system and hence the target can be tracked.

Figure 3:
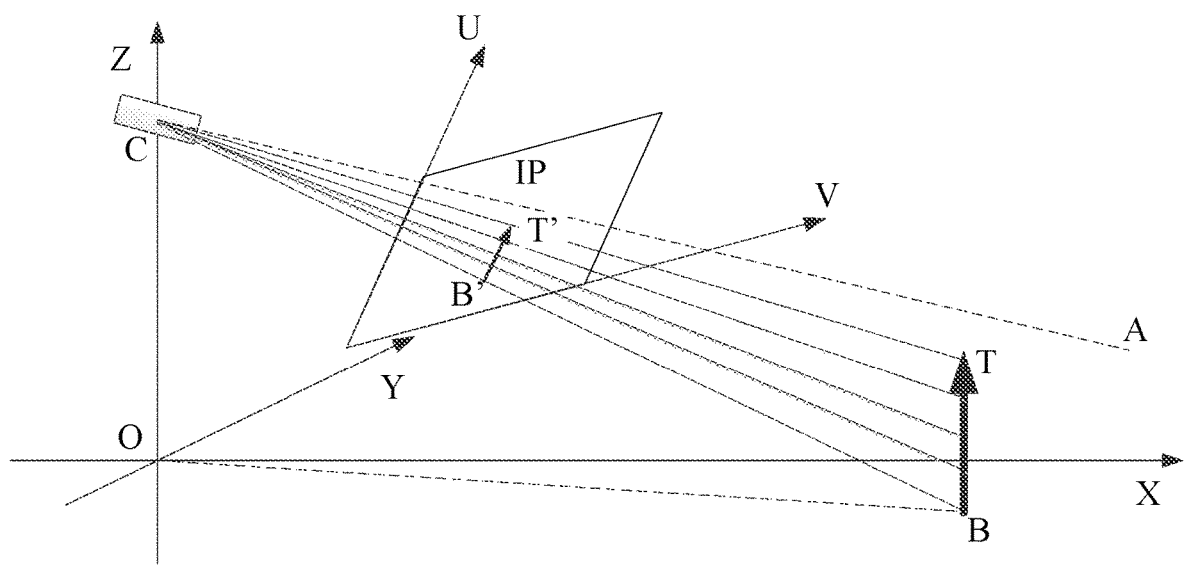
FIG. 3 is a schematic diagram of an example method for determining a location of a tracked target consistent with various disclosed embodiments of the present disclosure.

FIG. 3 is a schematic diagram of an example method for determining a location of a tracked target consistent with various disclosed embodiments of the present disclosure. Referring to FIG. 3, reference letter C denotes an optical center of an imaging system, CA denotes an optical axis of the imaging system, and TB denotes the tracked target. Taking point O as the origin, a first coordinate system XYZ is established. Coordinate values of point B are denoted as $(x_b, y_b, z_b)$, and coordinate values of point T is denoted as $(x_t, y_t, z_t)$. IP denotes an image plane of the imaging system, and a second coordinate system UV is established in the image plane. T'B' denotes an image of the tracked target TB projected on the image plane, where coordinate values of point B' in the second coordinate system UV are denoted as $(u_b, v_b)$, and coordinate values of point T' in the second coordinate system UV are denoted as $(u_t, v_t)$.

According to the above descriptions, a direction vector $\vec{T}$ from the optical center C of the imaging system to the top measurement point T of the tracked target can be expressed as:

$$\vec{T} = \begin{pmatrix} x_t \\ y_t \\ z_t \end{pmatrix} \sim RK^{-1} \begin{pmatrix} u_t \\ v_t \\ 1 \end{pmatrix},$$

and a direction vector $\vec{B}$ from the optical center C of the imaging system to the bottom measurement point B of the tracked target can be expressed as:

$$\vec{B} = \begin{pmatrix} x_b \\ y_b \\ z_b \end{pmatrix} \sim RK^{-1} \begin{pmatrix} u_b \\ v_b \\ 1 \end{pmatrix},$$

where K denotes an inherent matrix of the imaging system, and R denotes a rotation matrix.

A horizontal distance between the tracked target and the imaging system is $$d = -\frac{h_c}{z_b} * P_b,$$

and real time measurement data of vertical height of the tracked target is $$h_o = h_c + \frac{z_t d}{P_t},$$

where $P_b = \sqrt{x_b^2 + y_b^2}$, and $P_t = \sqrt{x_t^2 + y_t^2}$.

Thus, according to current vertical height data of the imaging system, a focal length parameter, a calibration parameter, and one or more attitude parameters of the imaging system, and the obtained direction vectors $\vec{T}$ and $\vec{B}$, and through a coordinate system transformation and a trigonometric relationship, a horizontal distance between the tracked target and the imaging system, and real time measurement data of vertical height of the tracked target can be calculated.

Figure 4:
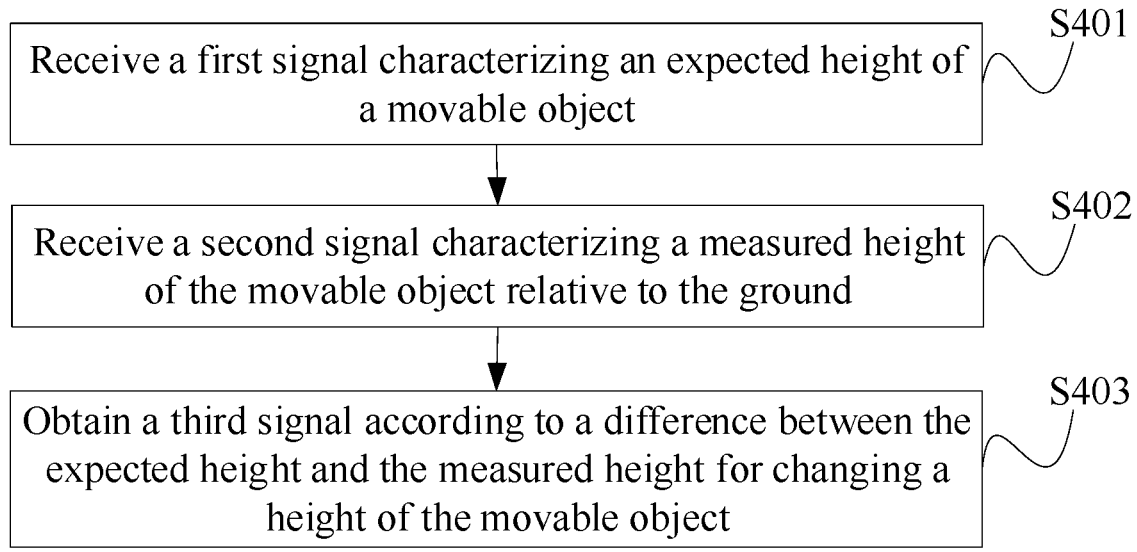
FIG. 4 is a flow chart of an example method for controlling a movable object consistent with various disclosed embodiments of the present disclosure.

FIG. 4 is a flow chart of an example method for controlling a movable object consistent with various disclosed embodiments of the present disclosure. With reference to FIG. 4, the method is described below.

At S401, a first signal is received, where the first signal characterizes an expected height of the movable object.

In some embodiments, the expected height may include a height of the movable object relative to a reference point, where the reference point may include at least one of a measurement point, a starting point, or an input value. In some embodiments, the expected height may include a user defined height that satisfies requirements of no-fly and/or fly-restriction regulations.

At S402, a second signal is received, where the second signal characterizes a measured height of the movable object relative to the ground.

In some embodiments, the measured height may include a height of the movable object relative to a reference point, where the reference point includes at least one of a measurement point, a starting point, or an input value.

In some embodiments, the measured height may include a height of the movable object relative to a reference point, and a height of the reference point may be, for example, an average of ground height within a preset time duration or an average of ground height within a preset distance.

At S403, a third signal is obtained according to a difference between the expected height and the measured height, where the third signal is used for changing a height of the movable object.

In some embodiments, the measured height may include a height of the movable object relative to a reference point, and a height of the reference point may be, for example, an average of ground height within a preset time duration or an average of ground height within a preset distance. The third signal may be obtained according to the difference between the expected height and the measured height, and the third signal may be used for changing a height of the movable object, such that the movable object can fly within a safe height range.

In some embodiments, the method may further include, after the third signal is obtained according to the difference between the expected height and the measured height, controlling the movable object to be at the expected height, through a feedback control system.

Specifically, the feedback control system may include a proportional-integral-derivative (PID) controller. The PID controller may take an initial tracking height as an expected height, take the difference between the expected height and the measured height as an error amount, and take the error amount as an input amount of the PID controller. Accordingly, an output amount may be an expected speed of the movable object in a vertical direction to control the aerial vehicle to reach the expected height.

In some embodiments, the measured height of the movable object relative to the ground may be obtained according to a signal measured by the sensor.

In some embodiments, according to a position of the movable object, a measured height of the movable object relative to the ground is selected from signals measured by one or more sensors, where the position of the movable object may include a height of the movable object relative to the ground.

In some embodiments, at a first height, a measured height according to a first sensor may be selected as the measured height of the movable object relative to the ground. At a second height, a measured height according to a second sensor may be selected as the measured height of the movable object relative to the ground.

In some embodiments, according to a position of the movable object, a measurement signal measured by the first sensor and one or more measurement signals measured by a second sensor may be selected. Further, the measured height of the movable object may be determined according to the measurement signal measured by the first sensor and the one or more measurement signals measured by the second sensor. In some embodiments, the measurement signal measured by the first sensor and the one or more measurement signals measured by the second sensor may be fused by a Kalman filter algorithm to obtain the measured height of the movable object relative to the ground.

In some embodiments, the sensor may include at least one of a binocular camera, an ultrasonic sensor, an air pressure gauge, a millimeter wave radar, or a laser.

In response to a distance of the movable object relative to the ground being smaller than or equal to a first threshold, the measured height of the movable object relative to the ground may be determined according to a measurement signal of the ultrasonic sensor.

In response to the distance of the movable object relative to the ground being larger than the first threshold and smaller than or equal to a second threshold, a measurement signal of the ultrasonic sensor and a measurement signal of the binocular camera may be fused to obtain the measured height of the movable object relative to the ground. In some embodiments, the measurement signal of the ultrasonic sensor and the measurement signal of the binocular camera may be fused by the Kalman filter algorithm to obtain the measured height of the movable object relative to the ground.

In response to the distance of the movable object from the ground being larger than the second threshold and being smaller than or equal to a third threshold, the measured height of the movable object relative to the ground may be determined according to the measurement signal of the binocular camera.

In response to the distance of the movable object relative to the ground being larger than the third threshold, the measured height of the movable object relative to the ground may be determined according to a measurement signal of the air pressure gauge.

In some embodiments, the first threshold, the second threshold, and the third threshold may be determined according to effective measurement ranges and measurement accuracies of the sensors. An accuracy of the binocular camera may decrease with increasing distance, and measurement data of the binocular camera may be relatively accurate at approximately 10 meters to approximately 0.5 meters. A measurement accuracy of the ultrasonic sensor may not change with distance, but measurement data may disappear as the UAV body attitude changes. Further, a measurement distance of the ultrasonic sensor may only range from approximately 0 meters to approximately 3 meters. The air pressure gauge may have a relatively wide measurement range and can measure a height up to approximately 1000 meters. However, the height measured by the air pressure gauge may be a relative height, which can only be a difference between a take-off height and a current height of the air pressure gauge, but cannot obtain an accurate height relative to the ground. According to effective measurement ranges and measurement accuracies of the binocular camera, the ultrasonic sensor, and the air pressure gauge, the first threshold can be taken as approximately 0.5 meters, the second threshold can be taken as approximately 3 meters, and the third threshold can be taken as approximately 10 meters.

In some embodiments, the method may further include tracking the target while the movable object is flying at an expected height.

In some embodiments, tracking the target may include tracking the target according to vision, or tracking the target according to a target signal. The target signal may include a GPS signal.

In some embodiments, tracking the target may include holding a horizontal distance between the movable object and the target at a constant value or within a preset range.

In some embodiments, tracking the target may include maintaining a linear distance between the movable object and the target at a constant value or within a preset range.

Figure 5:
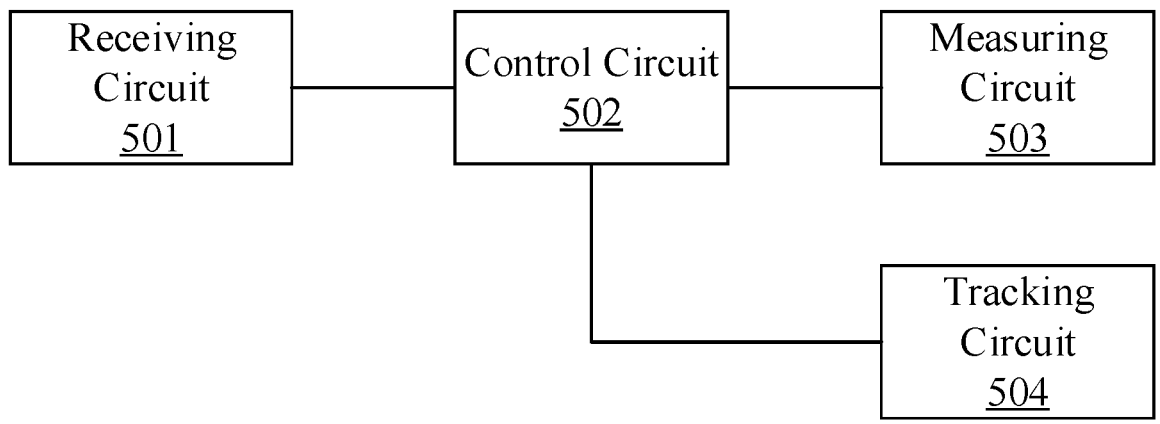
FIG. 5 illustrates a block diagram of an example apparatus for controlling a movable object consistent with various disclosed embodiments of the present disclosure.

FIG. 5 illustrates a block diagram of an example apparatus 500 for controlling a movable object consistent with various disclosed embodiments of the present disclosure. As shown in FIG. 5, the apparatus 500 includes a receiving circuit, a control circuit 502, a measuring circuit 503, and a tracking circuit 504.

The receiving circuit 501 is configured to receive a first signal. The first signal can characterize an expected height of the movable object.

In some embodiments, the expected height may include a height of the movable object relative to a reference point, where the reference point may include at least one of a measurement point, a starting point, or an input value. In some embodiments, the expected height may include a user defined height that satisfies requirements of no-fly and/or fly-restriction regulations.

The receiving circuit 501 is further configured to receive a second signal, where the second signal characterizes a measured height of the movable object relative to the ground.

In some embodiments, the measured height may include a height of the movable object relative to a reference point, where the reference point includes at least one of a measurement point, a starting point, or an input value.

In some embodiments, the measured height may include a height of the movable object relative to a reference point, and a height of the reference point may be, for example, an average of ground height within a preset time duration or an average of ground height within a preset distance.

The control circuit 502 is configured to obtain a third signal according to a difference between the expected height and the measured height, where the third signal is used for changing a height of the movable object.

In some embodiments, the measured height may include a height of the movable object relative to a reference point, and a height of the reference point may be, for example, an average of ground height within a preset time duration or an average of ground height within a preset distance. The third signal may be obtained according to the difference between the expected height and the measured height, and the third signal may be used for changing a height of the movable object, such that the movable object can fly within a safe height range.

In some embodiments, the control circuit 502 may be configured to control, after the third signal is obtained according to the difference between the expected height and the measured height, the movable object to be at the expected height, through a feedback control system.

In some embodiments, the feedback control system may include a proportional-integral-derivative (PID) controller. The PID controller may take an initial tracking height as an expected height, take the difference between the expected height and the measured height as an error amount, and take the error amount as an input amount of the PID controller. Accordingly, an output amount may be an expected speed of the movable object in a vertical direction to control the aerial vehicle to reach the expected height.

In some embodiments, the apparatus 500 for controlling the movable object, also referred to as a "control apparatus 500" for controlling the movable object, may further include a measuring circuit 503. The measuring circuit 503 may include one or more sensors for measuring measured heights of the movable object relative to the ground.

In some embodiments, the measuring circuit 503 may be configured to select, according to a position of the movable object, a measured height of the movable object relative to the ground from signals measured by one or more sensors, where the position of the movable object may include a height of the movable object relative to the ground.

In some embodiments, the measuring circuit 503 may be further configured to select, at a first height, a measured height according to a first sensor as the measured height of the movable object relative to the ground, and to select, at a second height, a measured height according to a second sensor as the measured height of the movable object relative to the ground.

In some embodiments, the measuring circuit 503 may be further configured to select, according to a position of the movable object, a measurement signal measured by the first sensor and one or more measurement signals measured by the second sensor; and to determine the measured height of the movable object according to the measurement signal measured by the first sensor and the one or more measurement signals measured by the second sensor. In some embodiments, the measurement signal measured by the first sensor and the one or more measurement signals measured by the second sensor may be fused by a Kalman filter algorithm to obtain the measured height of the movable object relative to the ground.

In some embodiments, the sensor may include at least one of a binocular camera, an ultrasonic sensor, an air pressure gauge, a millimeter wave radar, or a laser.

The measuring circuit 503 may be further configured to determine the measured height of the movable object relative to the ground according to a measurement signal of the ultrasonic sensor, in response to the distance of the movable object relative to the ground being smaller than or equal to a first threshold.

The measuring circuit 503 may be further configured to fuse a measurement signal of the ultrasonic sensor and a measurement signal of the binocular camera to obtain the measured height of the movable object relative to the ground, in response to the distance of the movable object relative to the ground being larger than the first threshold and smaller than or equal to a second threshold. In some embodiments, the measurement signal of the ultrasonic sensor and the measurement signal of the binocular camera may be fused by the Kalman filter algorithm to obtain the measured height of the movable object relative to the ground.

The measuring circuit 503 may be further configured to determine the measured height of the movable object relative to the ground according to the measurement signal of the binocular camera, in response to the distance of the movable object from the ground being larger than the second threshold and being smaller than or equal to a third threshold.

The measuring circuit 503 may be further configured to determine the measured height of the movable object relative to the ground according to the measurement signal of the air pressure gauge, in response to the distance of the movable object relative to the ground being larger than the third threshold.

In some embodiments, the first threshold, the second threshold, and the third threshold may be determined according to effective measurement ranges and measurement accuracies of the sensors. An accuracy of the binocular camera may decrease with increasing distance, and measurement data of the binocular camera may be relatively accurate at approximately 10 meters to approximately 0.5 meters. A measurement accuracy of the ultrasonic sensor may not change with distance, but measurement data may disappear as the UAV body attitude changes. Further, a measurement distance of the ultrasonic sensor may only range from approximately 0 meters to approximately 3 meters. The air pressure gauge may have a relatively wide measurement range and can measure a height up to approximately 1000 meters. However, the height measured by the air pressure gauge is a relative height, which can only be a difference between a take-off height and a current height of the air pressure gauge, but cannot obtain an accurate height relative to the ground. According to effective measurement ranges and measurement accuracies of the binocular camera, the ultrasonic sensor, and the air pressure gauge, the first threshold can be taken as approximately 0.5 meters, the second threshold can be taken as approximately 3 meters, and the third threshold can be taken as approximately 10 meters.

In some embodiments, the tracking circuit 504 included in the apparatus 500 may be configured to track the target while the movable object is flying at an expected height.

The tracking circuit 504 may be further configured to track the target according to vision, or track the target according to a target signal. The target signal may include a GPS signal.

In some embodiments, tracking the target may include holding a horizontal distance between the movable object and the target at a constant value or within a preset range.

In some embodiments, tracking the target may include holding a linear distance between the movable object and the target at a constant value or within a preset range.

Figure 6:
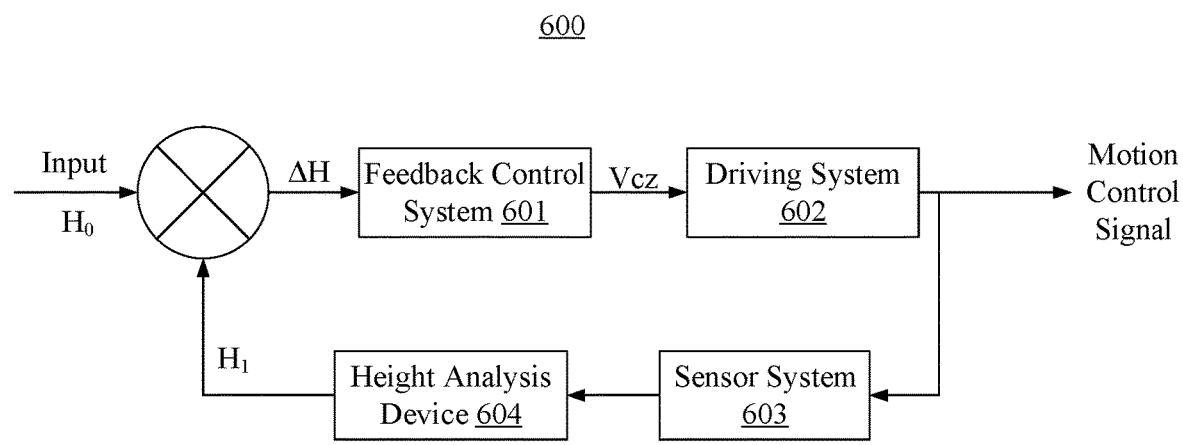
FIG. 6 illustrates a diagram of an example terrain tracking system consistent with various disclosed embodiments of the present disclosure.

FIG. 6 illustrates a diagram of an example terrain tracking system 600 consistent with various disclosed embodiments of the present disclosure, such as a UAV terrain tracking system. As shown in FIG. 6, an initial tracking height Ho is inputted as an expected height into the terrain tracking system, and is compared with a current measured height Hi to obtain an error amount A H. The error amount A H is taken as an input of a feedback control system 601. The feedback control system 601 sends an expected speed Vcz in the Z direction to a driving system 602. The driving system 602 generates a motion control signal to adjust a speed in the Z direction to control the UAV to reach the expected height.

For obtaining a current measured height Hi, signals are collected by a sensor system 603, sent to a height analysis device 604, and processed by the height analysis device 604 to obtain the current measured height Hi of the UAV.

In some embodiments, the feedback control system 601 may include a proportional-integral-derivative (PID) controller. The sensor system 603 may include at least one of a binocular camera, an ultrasonic sensor, an air pressure gauge, a millimeter wave radar, or a laser.

Figure 7:
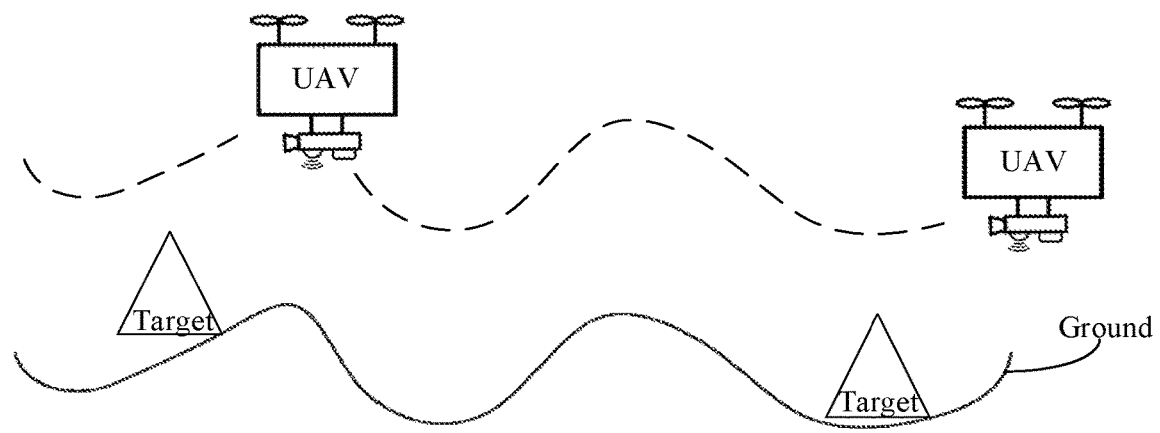
FIG. 7 illustrates a schematic view of an example UAV terrain tracking method consistent with various disclosed embodiments of the present disclosure.

FIG. 7 illustrates a schematic view of an example UAV terrain tracking method consistent with various disclosed embodiments of the present disclosure. As shown in FIG. 7, a dashed line denotes a UAV flight path, and as the UAV is tracking a target, a height of the UAV relative to a reference point is kept constant or within a preset range.

In some embodiments, the reference point may include a measurement point.

In some embodiments, the measurement point may include the ground directly and vertically below the UAV or other custom measurement point.

Figure 8:
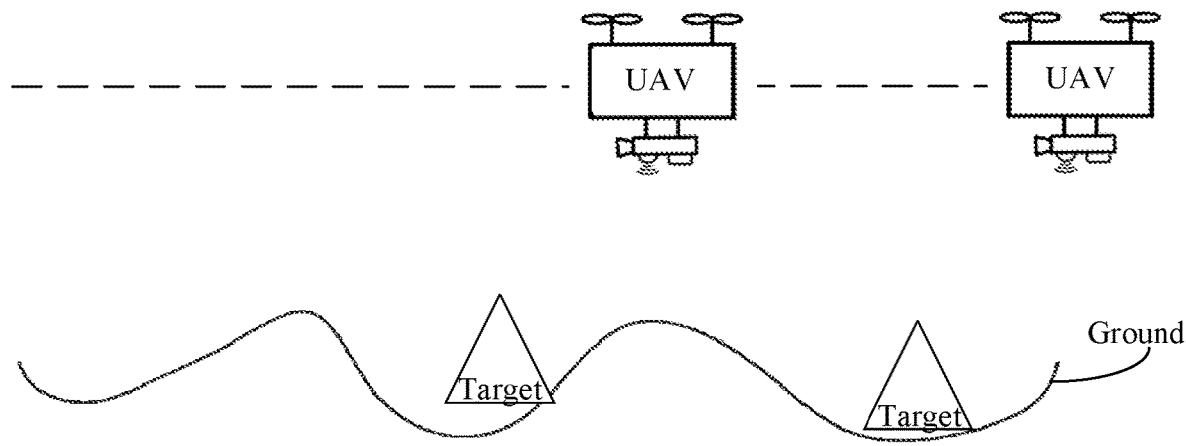
FIG. 8 illustrates a schematic view of another example UAV terrain tracking method consistent with various disclosed embodiments of the present disclosure.

FIG. 8 illustrates a schematic view of another example UAV terrain tracking method consistent with various disclosed embodiments of the present disclosure. As shown in FIG. 8, a dashed line denotes a UAV flight path, and as the UAV is tracking a target, a height of the UAV relative to a reference point is kept constant or within a preset range.

In some embodiments, the reference point may include a starting point of the UAV. For example, the starting point may include a starting position of the UAV or the ground vertically and directly below the UAV.

Figure 9:
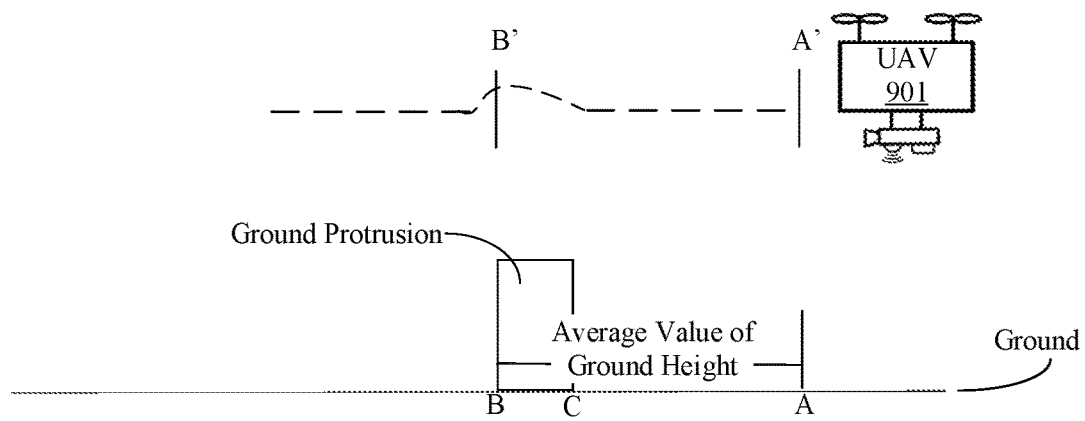
FIG. 9 illustrates a schematic view of another example UAV terrain tracking method consistent with various disclosed embodiments of the present disclosure.

FIG. 9 illustrates a schematic view of another example UAV terrain tracking method consistent with various disclosed embodiments of the present disclosure. As shown in FIG. 9, a dashed line denotes a UAV flight path, and as the UAV is tracking a target, a height of the UAV relative to a reference point is kept constant or within a preset range.

In some embodiments, when the UAV reaches point B', a height of the reference point may be an average value of heights of the ground AB vertically and directly below the UAV, where a length of AB can be customized. In contrast, the height of the reference point before the UAV reaches the ground C may be a horizontal ground level, e.g., approximately 0.

The present disclosure provides a UAV including an apparatus for controlling a movable object consistent with the disclosure, such as any one of the above-described example control apparatuses.

The present disclosure provides a movable object control system including a control circuit, and the control circuit is configured to perform processes of a method consistent with the disclosure for controlling a movable object.

The present disclosure provides a storage medium for storing instructions for executing processes of a method consistent with the disclosure for controlling a movable object.

The present disclosure provides a method and an apparatus for controlling a movable object, an UAV, a movable object control system, and a storage medium. The method may include receiving a first signal, where the first signal characterizes an expected height of the movable object; receiving a second signal, where the second signal characterizes a measured height of the movable object relative to the ground; obtaining a third signal according to a difference between the expected height and the measured height, where the third signal is used for changing a height of the movable object. As such, even when the terrain is complex and changing such that a tracked target moves uphill or downhill, a stable relative height with respect to the tracked target can be maintained.

Embodiments in this disclosure are described in a progressive manner, and descriptions are made with focuses on differences of the embodiments. For same or similar portions, reference can be made to each other among the embodiments. The apparatuses of the disclosure correspond to the methods of the disclosure. For apparatuses of the disclosure, reference can be made to relevant descriptions of the above-described method embodiments.

The method and apparatus for determining location information of a tracked target, the tracking apparatus, the UAV, the tracking system, and the storage medium of the present disclosure are described in detail above.

Those of ordinary skill in the art will appreciate that the example elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of example systems, devices, and units may be omitted and references can be made to the descriptions of the example methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computing device, such as a processor, a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A method for controlling a movable object comprising:
obtaining an expected height of the movable object;
obtaining a measured height of the movable object relative to a ground according to measurement data of one or more sensors selected from a plurality of sensors of different types based on a comparison between a distance of the movable object relative to the ground and one or more thresholds, the one or more thresholds being determined according to effective measurement ranges and measurement accuracies of the plurality of sensors; and
controlling a height of the movable object according to the expected height and the measured height.

2. The method according to claim 1, further comprising:
tracking a target as the movable object flies at the expected height based on vision or according to a target signal.

3. The method according to claim 2, wherein tracking the target according to the target signal includes tracking the target according to a signal of a global positioning system of the target.

4. The method according to claim 2, wherein tracking the target includes:
maintaining a horizontal distance between the movable object and the target at a first constant value or within a first preset range; or
maintaining a linear distance between the movable object and the target at a second constant value or within a second preset range.

5. The method according to claim 1, wherein:
the expected height includes a height of the movable object relative to a reference point;
the reference point includes at least one of a measurement point, a starting point, or an input value; and
a height of the reference point is an average of ground height within a preset time duration or within a preset distance.

6. The method according to claim 1, wherein:
obtaining the measured height of the movable object relative to the ground includes:
selecting a height measured by a first one of the plurality of sensors as the measured height of the movable object relative to the ground in response to the distance of the movable object relative to the ground being larger than a first threshold and smaller than a second threshold; and
selecting a height measured by a second one of the plurality of sensors as the measured height of the movable object in response to the distance of the movable object relative to the ground being larger than the second threshold; and
each of the plurality of sensors includes at least one of a binocular camera, an ultrasonic sensor, an air pressure gauge, a millimeter wave radar, or a laser.

7. The method according to claim 1, wherein:
obtaining the measured height of the movable object relative to the ground includes:
selecting a first measurement signal of a first one of the plurality of sensors and one or more second measurement signals of one or more second ones of the plurality of sensors according to a position of the movable object;

determining the measured height of the movable object relative to the ground by fusing the first measurement signal and the one or more second measurement signals according to a Kalman filter algorithm; and each of the plurality of sensors includes at least one of a binocular camera, an ultrasonic sensor, an air pressure gauge, a millimeter wave radar, or a laser.

8. The method according to claim 1, wherein obtaining the measured height of the movable object relative to the ground includes:

determining the measured height of the movable object relative to the ground according to a measurement signal of an ultrasonic sensor, in response to the distance of the movable object relative to the ground being smaller than or equal to a first threshold.

9. The method according to claim 8, wherein obtaining the measured height of the movable object relative to the ground includes:

fusing the measurement signal of the ultrasonic sensor and a measurement signal of a binocular camera according to a Kalman filter algorithm to obtain the measured height of the movable object relative to the ground, in response to the distance of the movable object relative to the ground being larger than the first threshold and smaller than or equal to a second threshold.

10. The method according to claim 9, wherein obtaining the measured height of the movable object relative to the ground includes:

determining the measured height of the movable object relative to the ground according to the measurement signal of the binocular camera, in response to the distance of the movable object relative to the ground being larger than the second threshold and smaller than or equal to a third threshold.

11. The method according to claim 10, wherein obtaining the measured height of the movable object relative to the ground includes:

determining the measured height of the movable object relative to the ground according to a measurement signal of an air pressure gauge, in response to the distance of the movable object relative to the ground being larger than the third threshold.

12. The method according to claim 1, wherein obtaining the measured height of the movable object relative to the ground includes at least two of:

determining the measured height using a proximity sensor in response to the distance of the movable object relative to the ground being smaller than or equal to a first threshold;

determining the measured height using the proximity sensor and a vision sensor in response to the distance of the movable object relative to the ground being larger than the first threshold and smaller than or equal to a second threshold;

determining the measured height using the vision sensor in response to the distance of the movable object relative to the ground being larger than the second threshold and smaller than or equal to a third threshold; or determining the measured height using a pressure sensor in response to the distance of the movable object relative to the ground being larger than the third threshold;

wherein the first threshold, the second threshold, and the third threshold are determined according to effective measurement ranges and measurement accuracies of the proximity sensor, the vision sensor, and the pressure sensor.

13. The method according to claim 1, wherein obtaining the measured height of the movable object relative to the ground includes at least two of:

determining the measured height according to a measurement signal of an ultrasonic sensor in response to the distance of the movable object relative to the ground being smaller than or equal to a first threshold;

determining the measured height by fusing the measurement signal of the ultrasonic sensor and a measurement signal of a binocular camera in response to the distance of the movable object relative to the ground being larger than the first threshold and smaller than or equal to a second threshold;

determining the measured height according to the measurement signal of the binocular camera in response to the distance of the movable object relative to the ground being larger than the second threshold and smaller than or equal to a third threshold; or determining the measured height according to a measurement signal of an air pressure gauge in response to the distance of the movable object relative to the ground being larger than the third threshold;

wherein the first threshold, the second threshold, and the third threshold are determined according to effective measurement ranges and measurement accuracies of the ultrasonic sensor, the binocular camera, and the pressure gauge.

14. An apparatus for controlling a movable object comprising:

a processor; and a memory storing instructions that, when executed by the processor, cause the processor to:

obtain an expected height of the movable object;

obtain a measured height of the movable object relative to a ground according to measurement data of one or more sensors selected from a plurality of sensors of different types based on a comparison between a distance of the movable object relative to the ground and one or more thresholds, the one or more thresholds being determined according to effective measurement ranges and measurement accuracies of the plurality of sensors; and control a height of the movable object according to the expected height and the measured height.

15. The apparatus according to claim 14, wherein the instructions further cause the processor to:

track a target as the movable object flies at the expected height based on vision or according to a target signal.

16. The apparatus according to claim 15, wherein the instructions further cause the processor to:

track the target according to a signal of a global positioning system of the target.

17. The apparatus according to claim 15, wherein the instructions further cause the processor to:

maintain a horizontal distance between the movable object and the target at a first constant value or within a first preset range; or maintain a linear distance between the movable object and the target at a second constant value or within a second preset range.

18. The apparatus according to claim 14, wherein:
the expected height includes a height of the movable object relative to a reference point;
the reference point includes at least one of a measurement point, a starting point, or an input value; and
a height of the reference point is an average of ground height within a preset time duration or within a preset distance.

19. The apparatus according to claim 14, wherein:
the instructions further cause the processor to:
select a height measured by a first one of the plurality of sensors as the measured height of the movable object relative to the ground in response to the distance of the movable object relative to the ground being larger than a first threshold and smaller than a second threshold; and
select a height measured by a second one of the plurality of sensors as the measured height of the movable object in response to the distance of the movable object relative to the ground being larger than the second threshold; and
each of the plurality of sensors includes at least one of a binocular camera, an ultrasonic sensor, an air pressure gauge, a millimeter wave radar, or a laser.

20. The apparatus according to claim 14, wherein:
the instructions further cause the processor to:
select a first measurement signal of a first one of the plurality of sensors and one or more second measurement signals of one or more second ones of the plurality of sensors according to a position of the movable object;
determining the measured height of the movable object relative to the ground by fusing the first measurement signal and the one or more second measurement signals according to a Kalman filter algorithm; and
each of the plurality of sensors includes at least one of a binocular camera, an ultrasonic sensor, an air pressure gauge, a millimeter wave radar, or a laser.

21. The apparatus according to claim 14, wherein the instructions further cause the processor to:
determine the measured height of the movable object relative to the ground according to a measurement signal of an ultrasonic sensor, in response to the distance of the movable object relative to the ground being smaller than or equal to a first threshold.

22. The apparatus according to claim 21, wherein the instructions further cause the processor to:
fuse the measurement signal of the ultrasonic sensor and a measurement signal of a binocular camera according to a Kalman filter algorithm to obtain the measured height of the movable object relative to the ground, in response to the distance of the movable object relative to the ground being larger than the first threshold and smaller than or equal to a second threshold.

23. The apparatus according to claim 22, wherein the instructions further cause the processor to:
determine the measured height of the movable object relative to the ground according to the measurement signal of the binocular camera, in response to the distance of the movable object relative to the ground being larger than the second threshold and smaller than or equal to a third threshold.

24. The apparatus according to claim 23, wherein the instructions further cause the processor to:
determine the measured height of the movable object relative to the ground according to a measurement signal of an air pressure gauge, in response to the distance of the movable object relative to the ground being larger than the third threshold.

25. An unmanned aerial vehicle (UAV) comprising:
an apparatus configured to control the UAV, the apparatus including:
a processor; and
a memory storing instructions that, when executed by the processor, cause the processor to:
obtain an expected height of the UAV;
obtain a measured height of the UAV relative to a ground according to measurement data of one or more sensors selected from a plurality of sensors of different types based on a comparison between a distance of the movable object relative to the ground and one or more thresholds, the one or more thresholds being determined according to effective measurement ranges and measurement accuracies of the plurality of sensors; and
control a height of the UAV according to the expected height and the measured height.

* * * * *